United States Patent

Keel et al.

[11] Patent Number: 5,461,528
[45] Date of Patent: Oct. 24, 1995

[54] SELF BUCKING SERVO TRANSDUCER

[75] Inventors: Beat G. Keel, Prior Lake; Gale Jallen, Roseville; Paul A. Jallen, Brooklyn Park; Lance E. Stover, Eden Prairie; Halden W. Larson, Mound, all of Minn.

[73] Assignee: Seagate Technology, Inc., Scotts Valley, Calif.

[21] Appl. No.: 174,140

[22] Filed: Dec. 28, 1993

Related U.S. Application Data

[63] Continuation-in-part of Ser. No. 935,056, Aug. 24, 1992, abandoned, which is a continuation-in-part of Ser. No. 573,878, Aug. 27, 1990, Pat. No. 5,210,669.

[51] Int. Cl.$^6$ ................................................. G11B 5/17
[52] U.S. Cl. ................................. 360/124; 360/77.05
[58] Field of Search ................................. 360/124, 121, 360/77.02, 77.05

[56] References Cited

U.S. PATENT DOCUMENTS

| | | | |
|---|---|---|---|
| 3,582,918 | 5/1971 | Tiemann | 360/67 |
| 4,008,493 | 2/1977 | Pizzuto | 360/124 |
| 4,012,782 | 3/1977 | Lazzari | 360/123 |
| 4,072,994 | 2/1978 | Takashima | 360/124 |
| 4,823,205 | 4/1989 | Hannon et al. | 369/14 |
| 4,962,437 | 10/1990 | Wilcox | 360/103 |
| 5,210,669 | 5/1993 | Weispfenning et al. | 360/124 |

FOREIGN PATENT DOCUMENTS

| | | |
|---|---|---|
| 0108386 | 5/1984 | European Pat. Off. . |
| 62-285214 | 11/1987 | Japan . |
| 1-211207 | 8/1989 | Japan . |

OTHER PUBLICATIONS

J. Desserre et al., "New Possibilities Offered by Integrated Heads to Reduce Crossfeed(Write to Read)", IEEE Transactions on Magnetics, vol. MAG–13, No. 5, Sep. 1977, pp. 1469–1471.

*Primary Examiner*—Aristotelis Psitos
*Assistant Examiner*—James T. Wilson
*Attorney, Agent, or Firm*—Kinney & Lange

[57] ABSTRACT

A servo head in a disc file data storage system includes a servo transducer and a coil which are connected so that noise induced by a nearby writing data head cancels. The servo transducer, mounted on a slider, reads information stored on a servo disc. The coil, also mounted on the slider, is connected to the servo transducer to produce an output signal so that noise signals induced in the servo transducer by operation of the data head tend to be canceled by noise signals induced in the coil by operation of the data head.

22 Claims, 15 Drawing Sheets

SELF BUCKING SERVO TRANSDUCER

This is a continuation-in-part of application Ser. No. 07/935,056, filed Aug. 24, 1992, now abandoned, which is a continuation-in-part of application Ser. No. 07/573,878, filed Aug. 27, 1990, now U.S. Pat. No. 5,210,669.

BACKGROUND OF THE INVENTION

This invention relates to servo heads in disc file data storage systems. In particular, the present invention relates to improved passive noise cancellation in servo heads by the use of a servo transducer and an integral noise cancellation coil.

Disc stack data storage systems contain a spindle which supports a number of magnetic media discs on which data is stored in concentric tracks by means of data heads adjacent to the discs which write and read magnetically encoded data. These data heads are mechanically linked to a servo head located on an electro mechanical actuator. The servo head and the actuator are part of a negative feedback, closed loop servo system which is used to move the data heads (and the servo head) from one track to another on their respective discs for track seek operations and to hold them directly over a track for track following.

The normal output signal of the servo head is encoded radial position information, which it reads from the servo disc. However, the servo head is also susceptible to picking up external electromagnetic radiation. Although all of the data heads in the disc stack data storage system can cause external electromagnetic radiation, in many instances, the main source of this external electromagnetic radiation is the data head adjacent to the data disc located across from the servo head and disc on the spindle. When that data head is writing data, it is also radiating noise to the servo head. The noise corrupts the normal radial position information for the servo system, thus, reducing the track following precision. Consequently, the data written at that time may not be completely within the actual data track boundaries. Later, when this data is being read, the normal track following precision has returned. However, the data head is then flying within the track boundaries trying to read data which may not be written completely within the track boundaries. This increases the probability that data errors will occur during reading.

A passive noise cancellation technique for servo heads is described in a commonly-assigned patent entitled Thin Film Servo Head Employing The Inactive Transducer Coils To Cancel Write Noise From Nearby Data Heads by L. A. Wilcox, U.S. Pat. No. 4,962,437, issued Oct. 9, 1990, and which is hereby incorporated by reference. In this patent, the servo head includes two servo transducers. The first servo transducer reads the servo information stored on the servo disc. The second servo transducer is located on the same slider as the first servo transducer, but has its pole tips recessed slightly from the servo disc surface to prevent it from reading a signal from the servo disc. Also, the two servo transducers are located on opposite rails or skis of the servo slider. The second servo transducer is connected to the first servo transducer with opposite coil polarity in either a series-opposing or parallel-opposing configuration. The noise induced in the second servo transducer (which is generated by the adjacent data head when it is writing data) tends to cancel similar noise which is induced in the first servo transducer. Therefore, during normal operation, the net output voltage of this combined servo head, even in the presence of noise, more closely approximates the signal read from the servo disc by the first servo transducer.

An impediment to the effectiveness of passive noise cancellation techniques for servo heads is the effect of signals from the servo disc on the second servo transducer. Although the second servo transducer may have its pole tips recessed slightly to reduce the effects of a signal from the servo disc, the effects can not always be totally eliminated. The poles of the second servo transducer may still link some signals from the servo disc to the second transducer's coil. Additionally, servo heads with two servo transducers may require more process steps to fabricate than single transducer servo heads. This is particularly true when one servo transducer is fabricated in close proximity to the other. For instance, if one servo transducer is placed on top of the other servo transducer, the number of process steps may be more than doubled. Each additional process step results in increased cost and complexity of the fabrication process.

SUMMARY OF THE INVENTION

The present invention further improves passive noise cancellation in servo heads of a disc stack data storage system. The present invention is based upon a recognition that a passive noise cancellation technique which uses a servo transducer positioned on a servo slider and connected to an adjacent noise cancellation coil also positioned on the servo slider offers improved noise cancellation, a less complex fabrication process and a reduction in fabrication costs.

The present invention increases track following precision and accuracy of the servo system by employing a noise cancellation coil connected to a servo transducer to cancel electromagnetic noise radiated from a data head which is positioned adjacent a nearby data disc. The invention utilizes a servo head, positioned between a data disc and a servo disc, and adjacent to the servo disc. The servo head produces a servo output signal as a function of servo information stored on the servo disc. The servo head includes a slider, a servo transducer mounted on the slider for reading the servo information stored on the servo disc, and a noise cancellation coil also mounted on the slider. In preferred embodiments, the noise cancellation coil is positioned immediately adjacent the servo transducer. The servo transducer and the noise cancellation coil are connected to produce the servo output signal so that noise signals induced in the servo transducer by operation of the data transducer tend to be canceled by noise signals induced in the noise cancellation coil by operation of the data transducer.

DETAILED DESCRIPTION OF THE PREFERRED EMBODIMENTS

Figure 1:
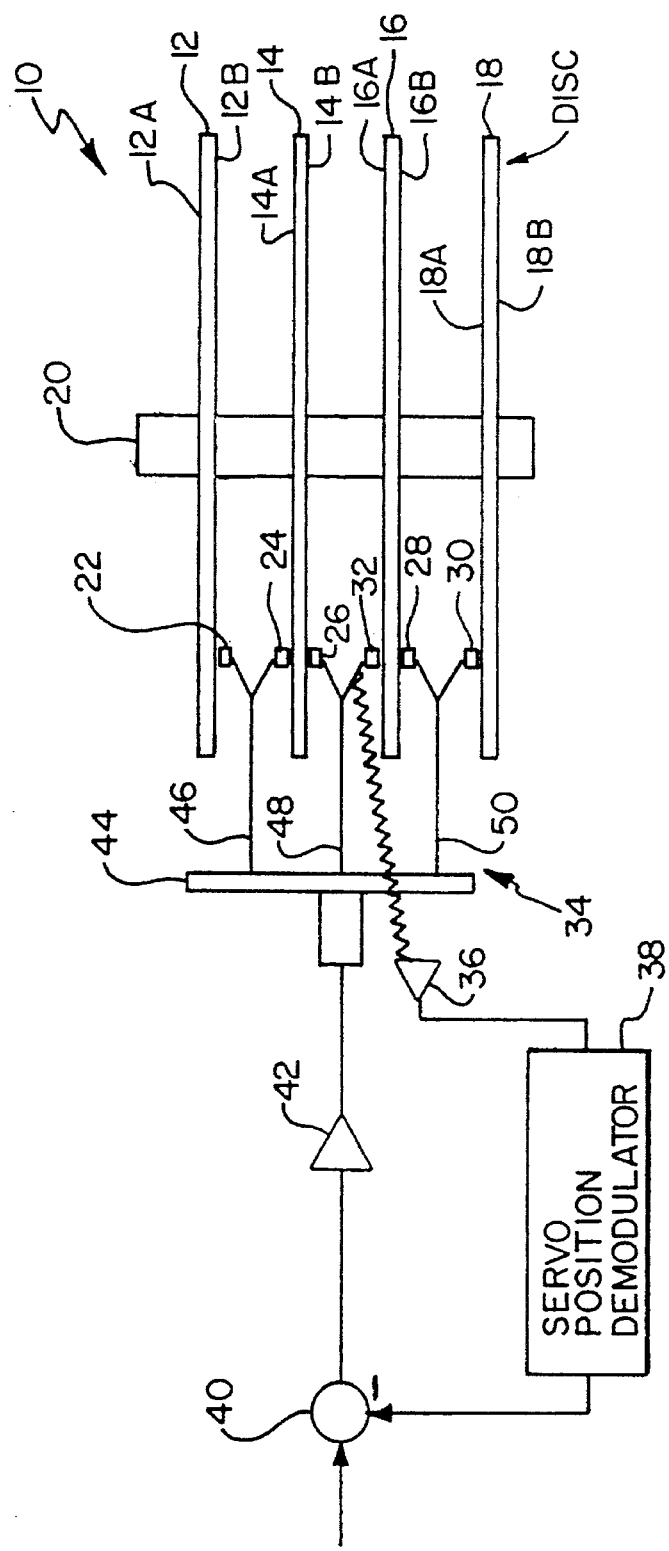
FIG. 1 is a block diagram of a servo system of a rotating disc data storage system.

FIG. 1 shows a typical disc file data storage system 10 which includes magnetic discs 12, 14, 16 and 18 which are mounted on spindle 20. Data storage system 10 is also sometimes referred to as a disc stack storage system. In the embodiment shown in FIG. 1, data head 22 writes data to and reads data from lower surface 12B of disc 12. Data head 24 reads data from and writes data to upper surface 14A of disc 14, while data head 26 reads data from and writes data to lower surface 14B of disc 14. Data head 28 reads data from and writes data to lower surface 16B of disc 16, and data head 30 reads data from and writes data to upper surface 18A of disc 18.

The positioning of data heads 22, 24, 26, 28 and 30 is controlled by a servo system which includes servo head 32, actuator 34, servo read amplifier 36, servo position demodulator 38, position error signal generator 40, and actuator driver 42. In this particular embodiment, actuator 34 includes an actuator spindle 44 and three actuator arm assemblies 46, 48, and 50. Data heads 22 and 24 are supported by flex arms at the distal end of actuator arm assembly 46. Data head 26 and servo head 32 are supported by flex arms at the distal end of actuator arm assembly 48. Data heads 28 and 30 are supported by flex arms at the distal end of actuator arm assembly 50.

Servo head 32 is positioned adjacent upper surface 16A of disc 16. Upper surface 16A acts as the servo disc surface, and has stored track information which is read by servo head 32 and supplied to servo read amplifier 36 and then to servo position demodulator 38. Servo position demodulator 38 produces an actual transducer position signal based upon information read by servo head 32. The actual transducer position signal is compared to a desired transducer position signal, and a position error signal is generated by position error signal generator 40. The position error signal is supplied through servo driver 42 to control operation of actuator 34. The servo system shown in FIG. 1 provides a negative feedback, closed loop control so that the data heads are moved generally in a radial direction with respect to discs 12, 14, 16 and 18 in order to move the data heads to a desired track during a track seek operation, and to hold the data heads over the desired track during a reading or writing operation.

Typically, data heads 22, 24, 26, 28 and 30, and servo head 32 are thin film magnetic transducers. FIG. 2 shows a typical prior art servo head, which includes slider 60 and thin film transducer 62. The construction of the servo and data heads is generally similar.

Figure 2A:
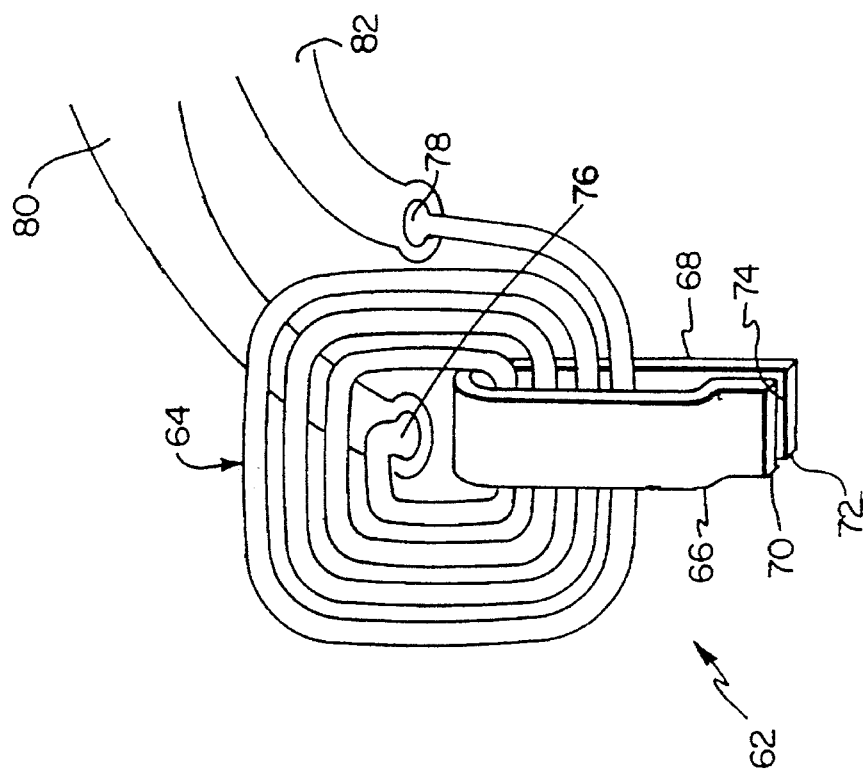
FIG. 2A is a diagrammatic view of a thin film transducer of the type shown in FIG. 2.
Figure 2:
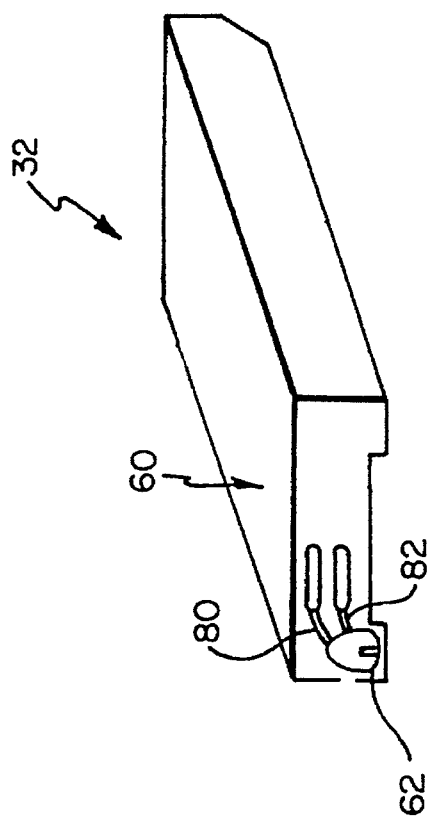
FIG. 2 is a perspective view of a typical servo or data head with a thin film magnetic transducer.

Transducer 62 is shown in further detail in FIG. 2A. Basically, transducer 62 includes a flat coiled conductor 64 and upper and lower pole pieces 66 and 68 which are formed in a U or horseshoe configuration. Upper and lower pole pieces 66 and 68 terminate in a pair of pole tips 70 and 72 with a gap 74 between them. Opposite ends 76 and 78 of coil conductor 64 are connected to transducer terminals 80 and 82, respectively. External leads can be connected to transducer terminals 80 and 82.

Pole pieces 66 and 68 loop through coil 64, and typically, pole tips 70 and 72 are oriented toward the disc surface. As the disc spins, the pole tips concentrate the low level magnetic flux from the track into coil 64, thus generating an output voltage signal.

Figure 3:
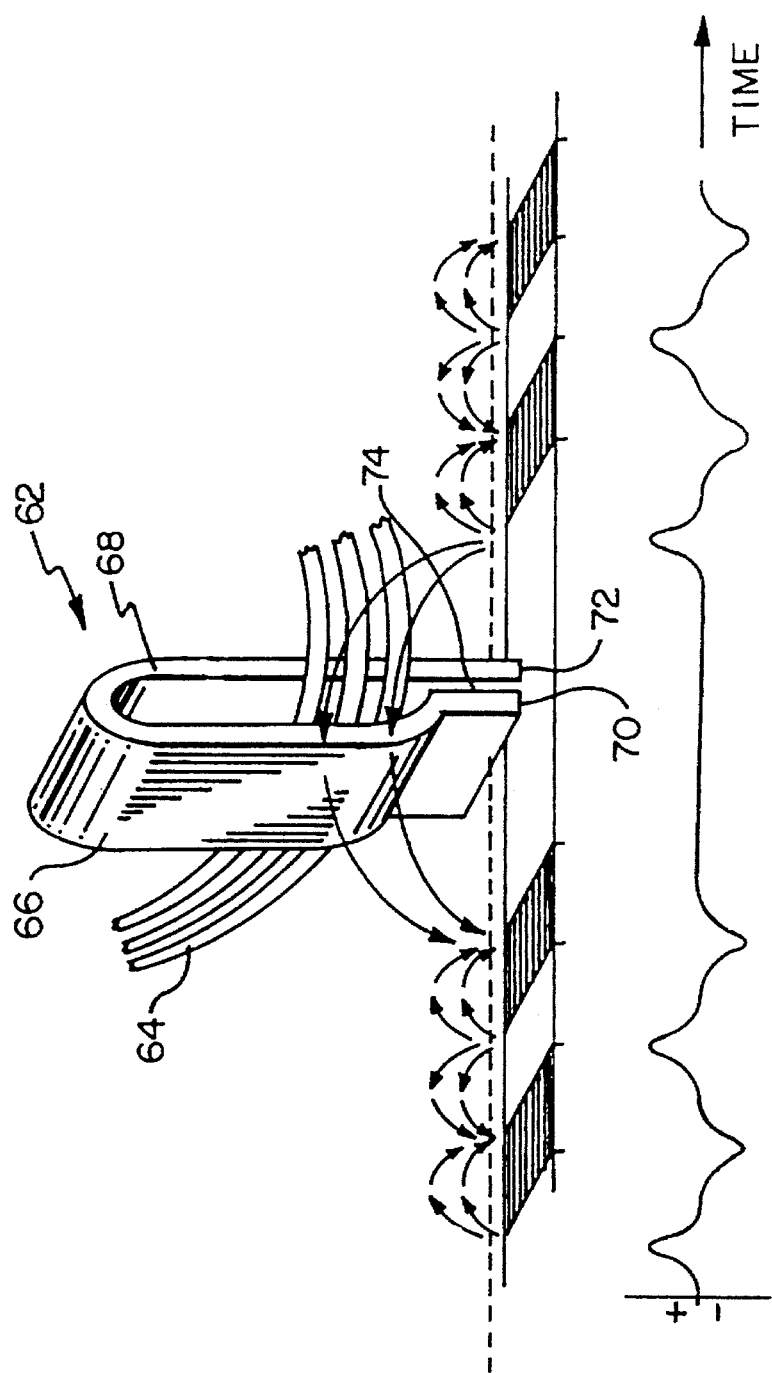
FIG. 3 is a diagram showing the relationship of the transducer to the track and to the transducer output signal.

FIG. 3 shows the operation of servo transducer 62 as a servo track on upper surface 16A of disc 16 moves relative to transducer 62. In FIG. 3, the transducer output voltage, which is derived from transducer terminals 80 and 82, is shown as a function of time as the servo track moves past pole tips 70 and 72.

The primary source of undesired electromagnetic radiation to servo transducer 62 of servo head 32 is data head 26 which shares the same actuator arm assembly 48 with servo head 32. As shown in FIG. 1, data head 26 and servo head 32 are both located between discs 14 and 16, with data head 26 adjacent lower surface 14B of disc 14, and servo head 32 adjacent upper surface 16A of disc 16. The undesired electromagnetic radiation to servo head 32 occurs when data head 26 is writing data.

As stated above, the primary source of undesired electromagnetic radiation to servo transducer 62 of servo head 32 is data head 26. This is true for several reasons. First, data head 26 is one of the data heads closest in proximity to servo head 32. Second, discs 14 and 16 help to shield servo head 32 from electromagnetic radiation from data heads 22, 24, 28 and 30. However, the trend in magnetic storage systems is to make discs which are thinner than previously used discs. As magnetic discs become thinner, they shield servo head 32 from noise generated by nearby data heads less effectively. Additionally, some discs are currently being manufactured from materials such as glass, which are not effective as shields. Therefore, data heads 22, 24, 28 and 30 can act as sources of undesired electromagnetic radiation as well. For ease of illustration, the assumption is initially made that only electromagnetic radiation from data head 26 affects servo head 32. However, it should be noted that the noise cancellation techniques of the present invention are available to reduce the effects of electromagnetic radiation from any of data heads 22, 24, 26, 28 and 30.

Figure 4:
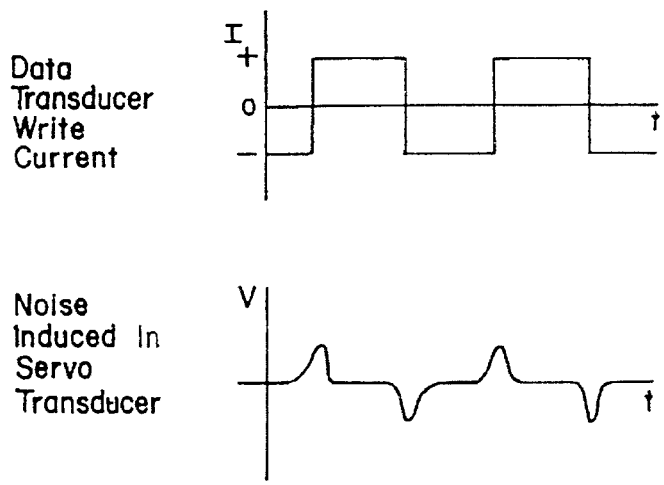
FIG. 4 is a diagram showing wave forms of data transducer write current and noise induced in a servo transducer as a function of time to show the relationship of data transducer write current to noise induced in the servo transducer.
Figure 5:
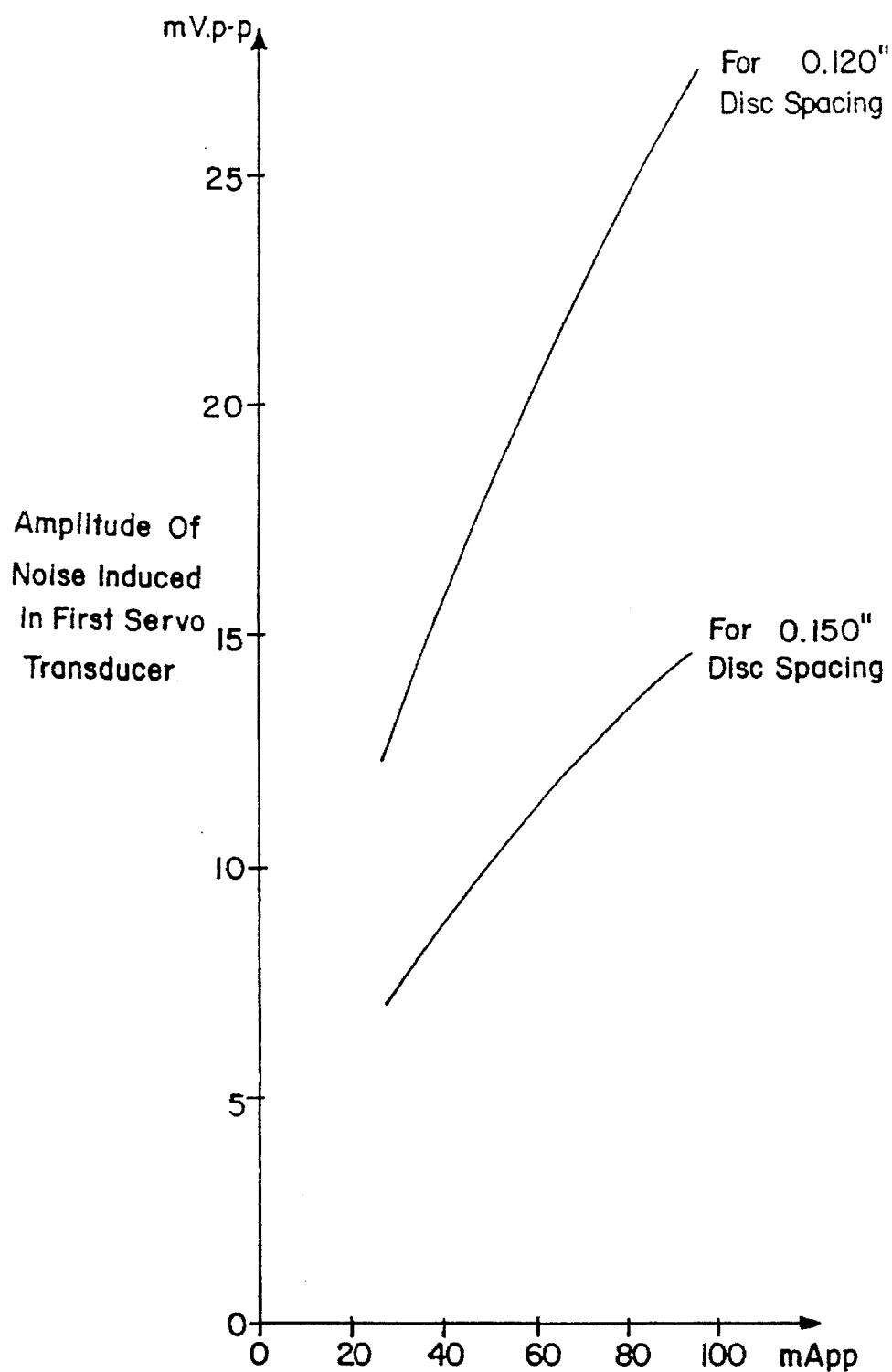
FIG. 5 is a graph showing amplitude of noise induced in a first servo transducer as function of magnitude of write current in the data transducer for two different disc spacings.

FIG. 4 illustrates the relationship of data transducer write current to noise induced in a servo transducer. As illustrated in FIG. 4, noise is induced in servo transducer 62 of servo head 32 with each transition in a nearby data transducer's write current. The amplitude of the noise induced in servo transducer 62 is proportional to the magnitude of the write current in data head 26, and also is related to the distance between servo transducer 62 in servo head 32 and the data transducer in data head 26. These effects are illustrated in FIG. 5. The further the servo transducer is located from the data transducer, the lower the amplitude of the noise induced for a given write current.

Figure 6:
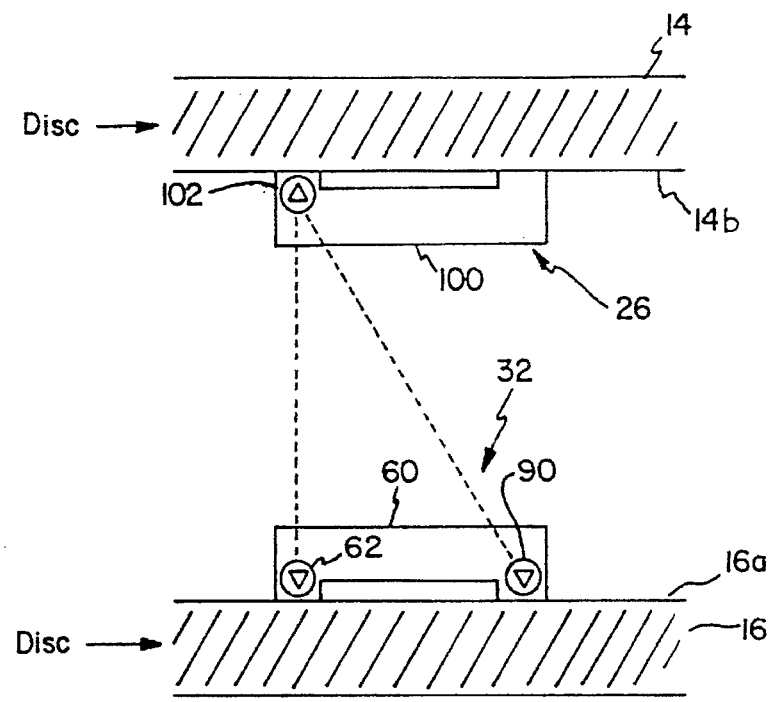
FIG. 6 shows a diagram of a servo head having passive noise cancellation, but without the improvement of the present invention.
Figure 7B:
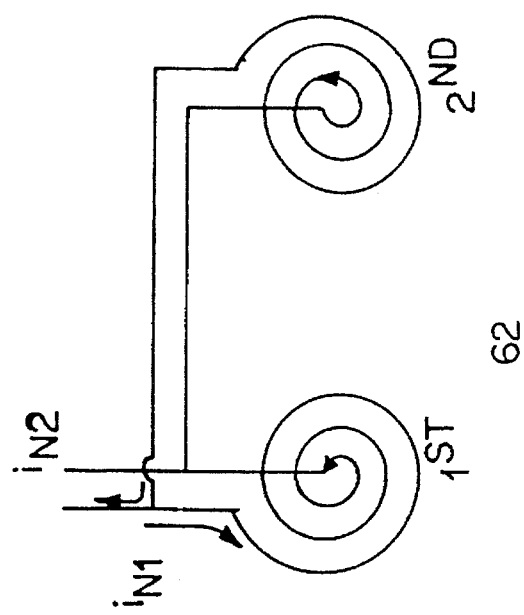
FIG. 7B shows first and second servo transducers connected in a parallel opposing configuration.
Figure 7A:
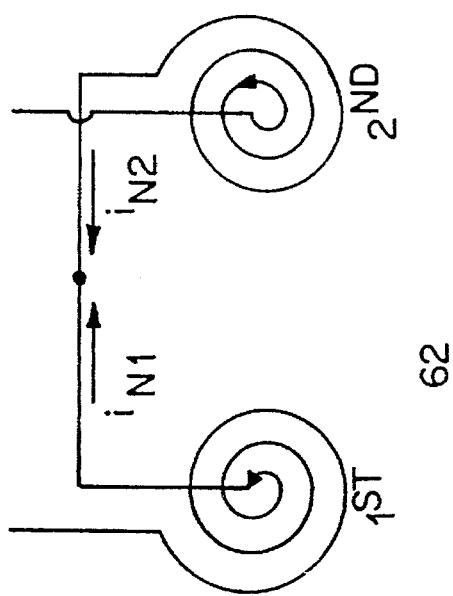
FIG. 7A shows the connection of first and second servo transducers in a series opposing configuration.

FIG. 6 illustrates a passive noise cancellation technique which is described in further detail in the previously mentioned U.S. Pat. No. 4,962,437. In this embodiment, servo head 32 includes first servo transducer 62 and a similar second servo transducer (or "inactive transducer") 90. Second servo transducer 90 is located on slider 60, but has its pole tips recessed slightly from surface 16A of disc 16. In FIG. 6, first servo transducer 62 is positioned on one rail or ski of servo slider 60, while servo transducer 90 is positioned on the other servo slider rail or ski. Second servo transducer 90 is connected to first servo transducer 62, but with opposite coil polarity in either a series opposing configuration as shown in FIG. 7A or a parallel opposing configuration as shown in FIG. 7B. In either case, the noise currents $i_{N1}$ and $i_{N2}$ induced by a write operation of data head 26 tend to cancel one another. Therefore, during normal operation, the net output voltage of the combined servo transducers 62 and 90, even in the presence of noise, more precisely reflects the signal read from the servo surface 16A of disc 16 than would a similar signal derived solely from first servo transducer 62.

As shown in FIG. 6, data head 26 includes a slider 100 and thin film magnetic data transducer 102. The construction and positioning of data transducer 102 is similar to the construction and positioning of first servo transducer 62. As shown in FIG. 6, first servo transducer 62 and data transducer 102 are generally aligned with one another and are closer to one another than are second servo transducer 90 and data transducer 102.

Noise cancellation by the use of first and second servo transducers 62 and 90 is directed specifically to noise induced by the write operation of data transducer 102 of data head 26. Discs 12, 14, 16 and 18 can be metal discs which effectively shield servo transducer 62 from data heads 22, 24, 28 and 30. That is not the case, however, with data head 26 which, like servo head 32, is positioned between discs 14 and 16. Also, as discussed previously, discs 12, 14, 16 and 18 may be constructed such that servo transducer 62 is not effectively shielded from data heads 22, 24, 28 and 30. In this case, noise from data heads 22, 24, 28 and 30 affects the servo signal read from disc 16, and therefore, this noise must be canceled as well.

Figure 8:
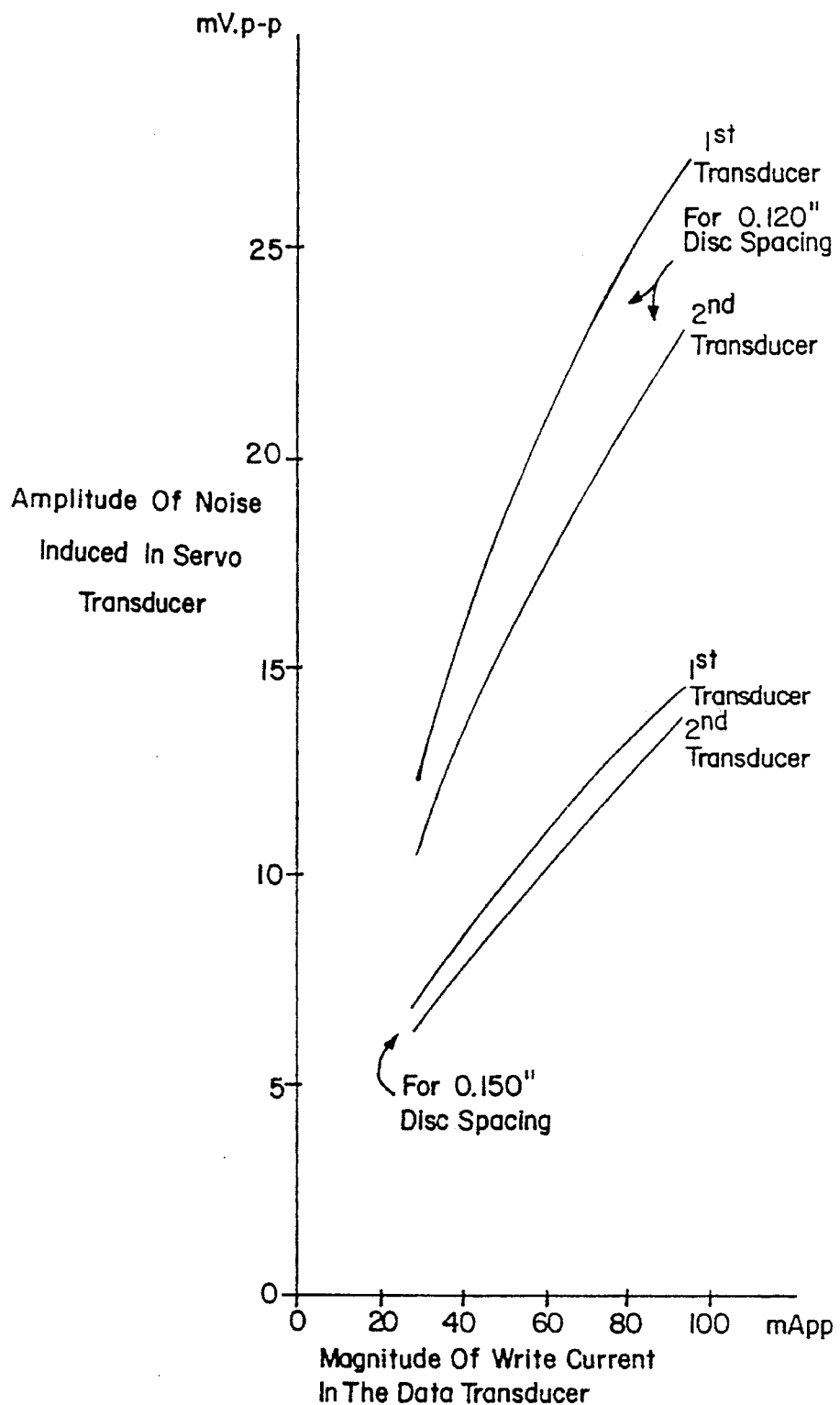
FIG. 8 is a graph showing amplitude of noise induced in a servo transducer as a function of magnitude of write current showing the effect of disc spacing on the amplitude of noise induced in the first and second servo transducers of the servo head shown in FIG. 6.

Although the passive noise cancellation provided by the structure shown in FIG. 6 represents an improvement over the use of only a single servo transducer, there are limitations to the effectiveness of the passive noise cancellation technique. First, the arrangement of servo transducers 62 and 90 as shown in FIG. 6 does not take into account the difference in distances between first and second servo transducers 62 and 90 and data transducer 102. Although the difference is small, it is enough to cause up to 20% difference in the amplitude of the noise induced in servo transducers 62 and 90. Because second servo transducer 90 is further from data transducer 102, lower amplitude noise is induced in second servo transducer 90. This is shown in FIG. 8 which illustrates the effect of disc spacing on the amplitude of noise induced in the first and second servo transducers. For disc spacing of 0.150 inches, there is a noticeable difference in the amplitude of the noise induced in the first and second servo transducers. For disc spacing of 0.120 inches, the difference between the amplitude of noise induced in the first and second servo transducers becomes more pronounced, and the difference increases as the magnitude of write current increases. Incomplete cancellation of noise from the servo read output signal affects the precision of the servo system during track following.

Figure 9:
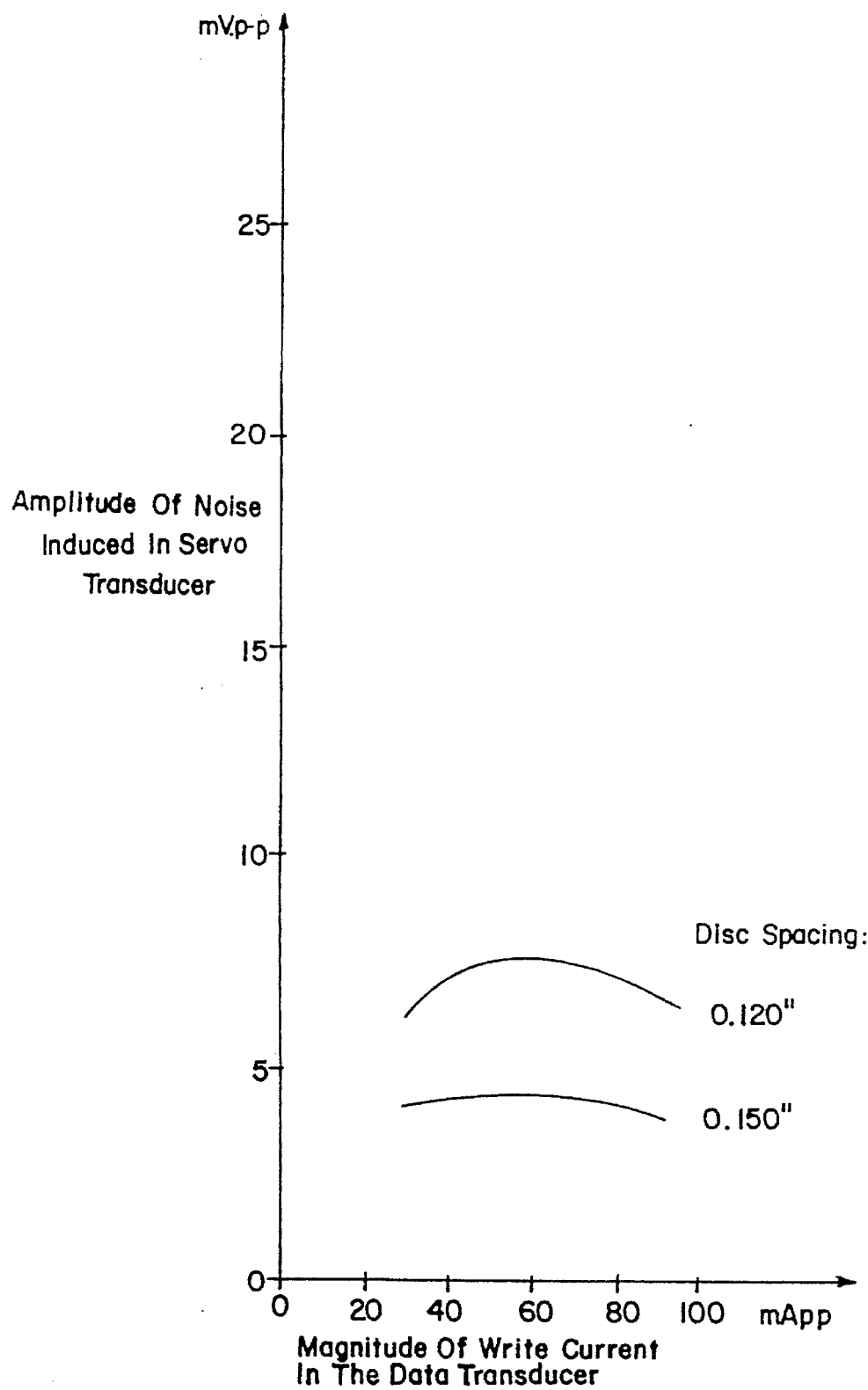
FIG. 9 is a graph of amplitude of noise induced in a servo transducer as a function of the magnitude of write current in the data transducer showing the effect of disc separation on the amplitude of noise induced in series opposing connected servo transducers.
Figures 10A, 10B, 10C, 10D:
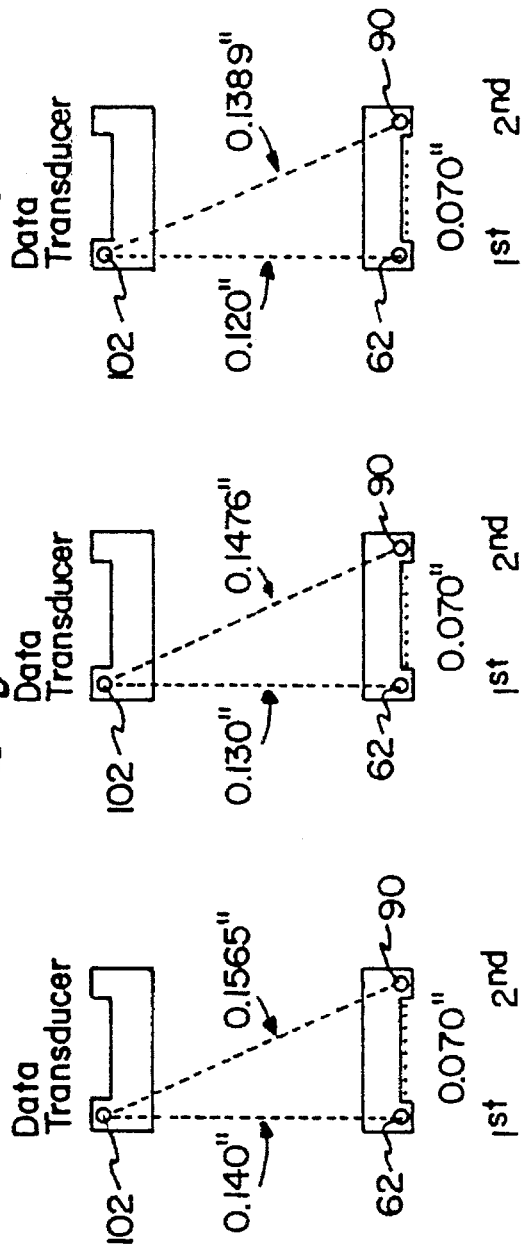
FIG. 10 illustrate the effect of disc separation on the distance of the first and second servo transducers from the data transducer.

FIG. 9 shows the effect of disc separation on the amplitude of noise induced when servo transducers 62 and 90 are connected in series opposing arrangement. From FIG. 9, it can be seen that net amplitude of noise induced becomes more pronounced as spacing between the discs is reduced.

FIGS. 10A–10D illustrate the effect of disc separation on the distances of the first and second servo transducers 62 and 90 from data transducer 102. In each FIGS. 10A–10D, the spacing between first and second servo transducers 62 and 90 is unchanged (0.070 inches) while the distance from first servo transducer 62 to data transducer 102 is reduced from 0.150 inches in FIG. 10A, to 0.140 inches in FIG. 10B, to 0.130 inches in FIG. 10C, to 0.120 inches in FIG. 10D. It can be seen that the difference between the distances becomes more pronounced as the distance between first servo transducer 62 and data transducer 102 is decreased.

In disc stack data storage systems which utilize discs which do not effectively shield electromagnetic radiation, data head 28, which is positioned directly across disc 16 from servo head 32, can cause significant noise in servo head 32. Because the distance between data head 28 and servo head 32 is likely to be less than the distance between data head 26 and servo head 32, in these systems, servo head 32 can be affected more by noise from data head 28 than by noise from data head 26. Therefore, the difference in spacing between the two servo transducers and a data transducer becomes even more dramatic. Consequently, it can be seen that the design of disc stack data storage systems inherently results in noise considerations which are unique to this type of system. Noise from various data heads depends upon disc spacing, disc thickness and the effectiveness of the disc material as a shield.

Figure 11:
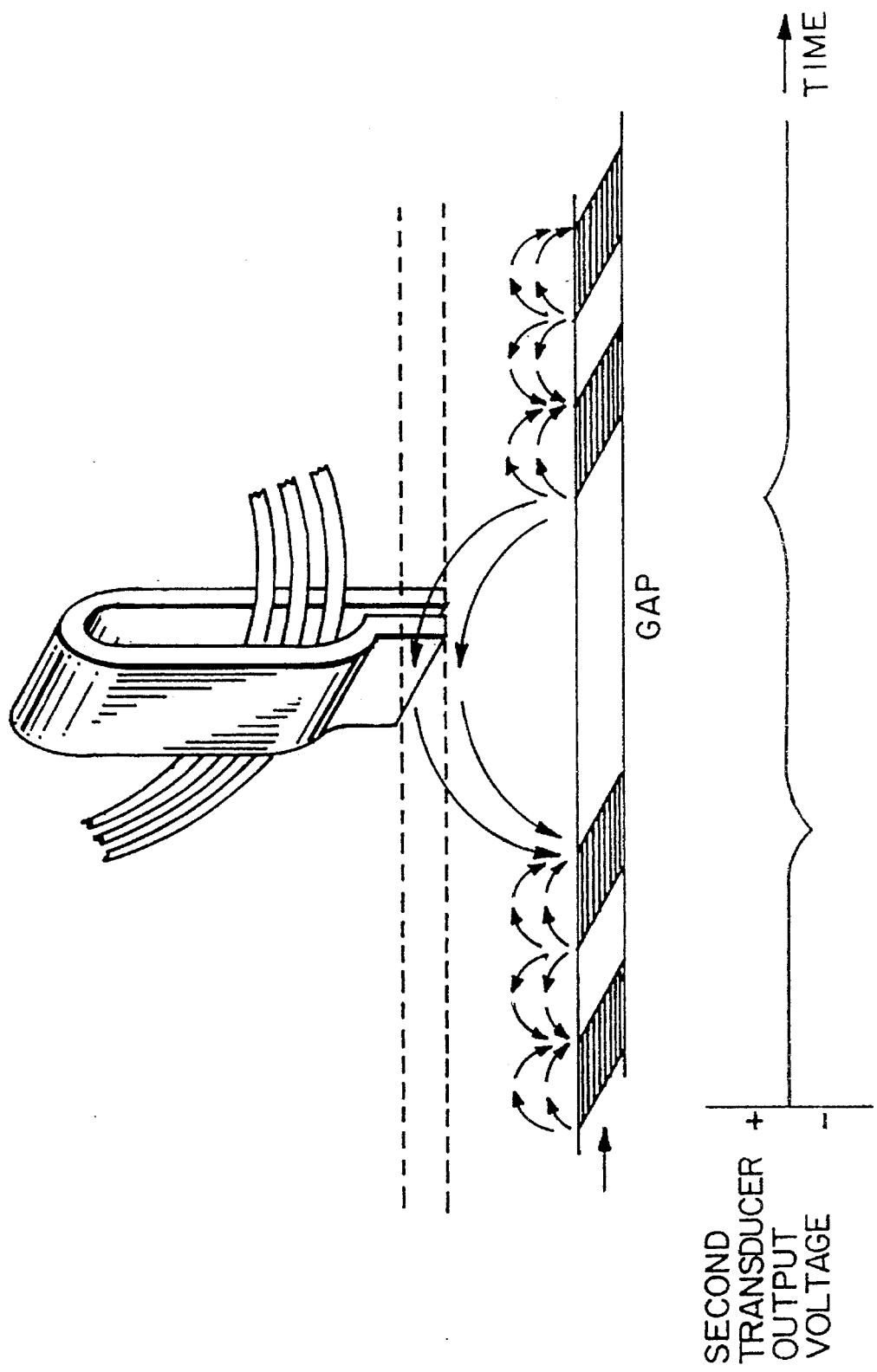
FIG. 11 is a diagram showing the relationship of the second servo transducer to the track and the second transducer output signal at the edges of gaps.

A second deficiency in the prior passive noise cancellation technique is that the second servo transducer 90, even though it is recessed slightly from the surface of disc 16, is still close enough to the surface that it can read a signal from certain types of servo track patterns. This effect is illustrated in FIG. 11. In particular, second servo transducer 90 can read a signal from the edges of gap fields which are found in sectored servo tracks. Examples of gap fields are Index fields (that are blank in every sector but one per revolution) and Track ID fields (that are essentially blank for certain digital track ID codes). These are longer wavelength structures than the normal servo pattern. In general, the signal amplitude from a transducer is a function of not only the space or distance between the transducer and disc, but also the wavelength of the magnetic pattern. This relationship is described in the following approximate formula for spacing loss, in dB:

$$\text{Spacing Loss} = (-55 \text{ dB}) d/\lambda$$

where d is the distance between the transducer pole tips and the disc surface, and $\lambda$ is the wavelength of the pattern. Thus, for a given distance, d, a longer wavelength structure, such as a gap field, has less signal loss. The distance, d, used in the prior passive noise cancellation technique is not large enough to eliminate the read signal from the gap fields. As illustrated in FIG. 11, the flux from a gap induces a low amplitude read signal in second servo transducer 90. The low amplitude signal corrupts the normal servo read signal generated in first servo transducer 62, and decreases the accuracy of the position information used by the servo control system.

Figure 12:
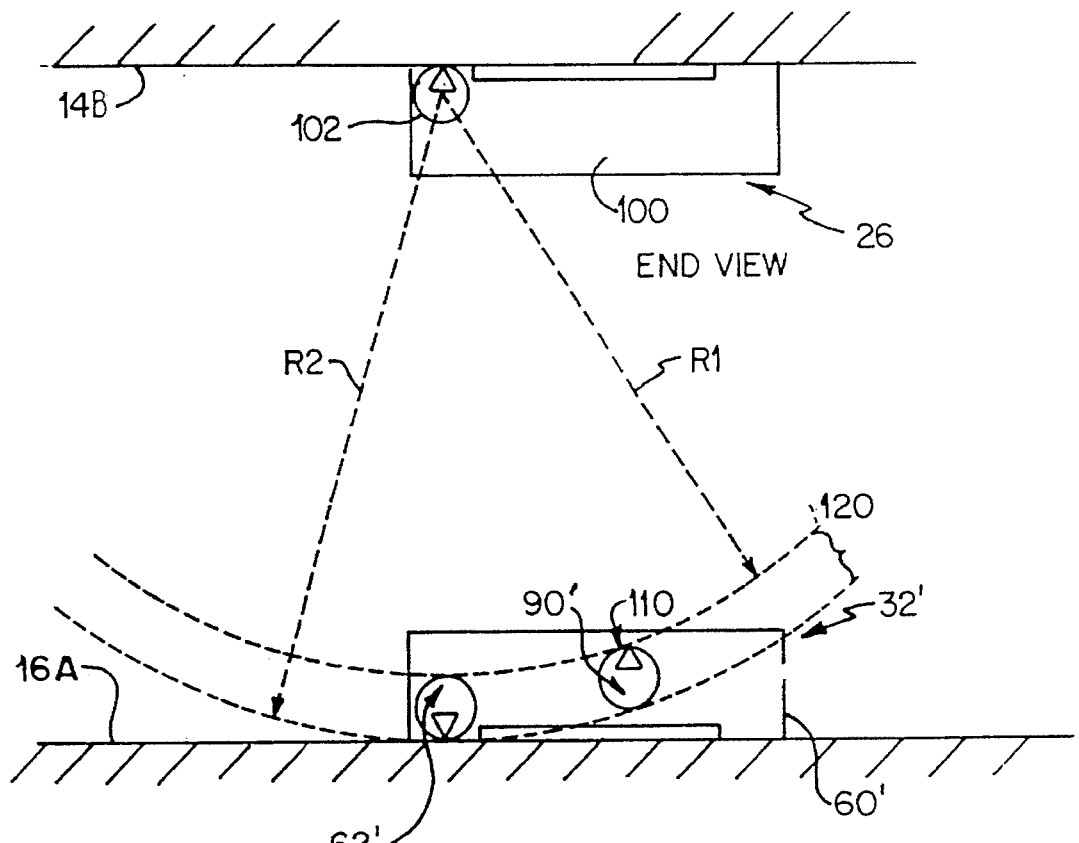
FIG. 12 is a diagram showing the placement and orientation of the first and second servo transducer for use with a single disc spacing distance.

FIG. 12 illustrates an embodiment of the invention set out in U.S. Pat. No. 5,210,669. In FIG. 12, servo head 32' includes a servo slider 60', first servo transducer 62', and second servo transducer 90'. Servo head 32' achieves an increase in track following precision by improving passive noise cancellation. In this embodiment, second servo transducer 90' is fabricated on servo slider 60' in a position such that first servo transducer 62' and second servo transducer 90' are an equal distance from data transducer 102 of data head 26. In addition, the pole tips 110 of second servo transducer 90' are oriented away from disc surface 16A to more effectively prevent second servo transducer 90' from reading a signal from disc 16.

When servo transducers 62' and 90' are connected with opposing polarity (as discussed previously), the output noise is completely canceled only if the amplitude of the noise induced in each separate transducer is equal. The amplitude of noise induced in servo transducers 62' and 90' is a function of the distances of those transducers from data transducer 102. For increased noise cancellation, therefore, servo transducers 62' and 90' are located at an equal distance from data transducer 102.

The distance between first servo transducer 62' and data transducer 102 is determined by the disc spacing between discs 14 and 16. Second servo transducer 90' is located in a circular zone of equidistance 120 which is drawn around the center of data transducer 102. This zone of equidistance is defined by first radius R1 which extends from the center of data transducer 102 to the uppermost portion of first servo transducer 62', and a second radius R2 which extends from the center of data transducer 102 to the lower most portion of first servo transducer 62'. As shown in FIG. 12, this zone of equidistance shows the zone on servo slider 60' where second servo transducer 90' can be positioned in accordance with the invention set out in U.S. Pat. No. 5,210,669.

Figure 13:
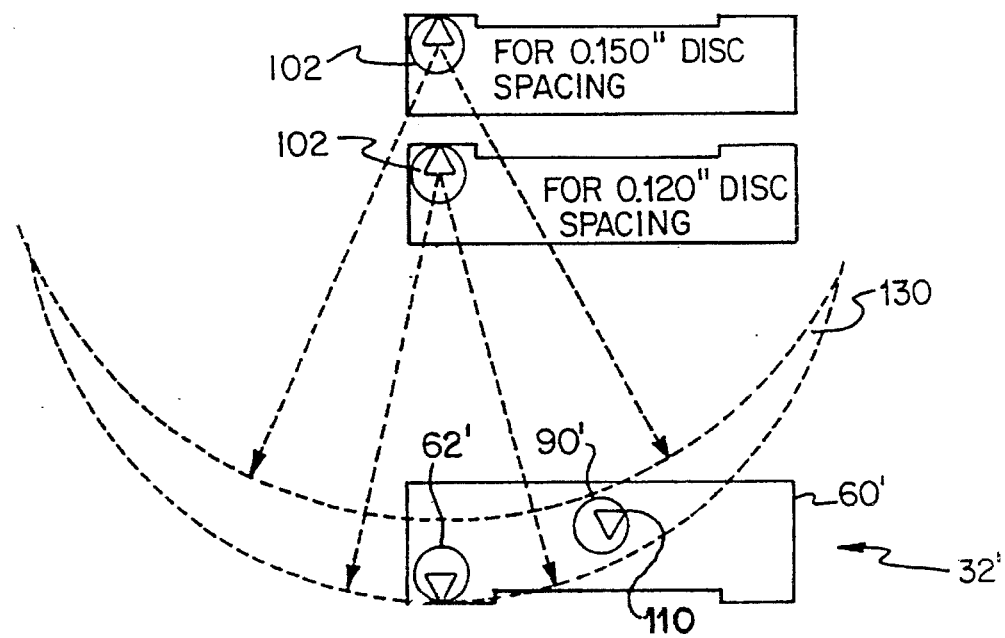
FIG. 13 is a diagram showing two different disc spacings and the placement and orientation of the first and second servo transducers to accommodate both disc spacing distances.

The location of the zone of equidistance 120 is a function of disc spacing. The sensitivity to disc spacing, however, can be decreased by placing second servo transducer 90' as close as possible to first servo transducer 62'. FIG. 13 shows the intersection of two zones of equidistance for two typical disc spacings (0.150 inches and 0.120 inches). The area of intersection 130 is widest near first servo transducer 62'.

Other constraints (such as the position of transducer output terminals on slider 60') can effect the exact position of second servo transducer 90' within the zone of equidistance 120 shown in FIG. 12, or the intersection of two zones of equidistance 130 as shown in FIG. 13.

Another important feature of the invention set out in U.S. Pat. No. 5,210,669 is that pole tips 110 of second servo transducer 90' are oriented generally away from the servo disc surface 16A. Second servo transducer 90' is essentially identical in construction to first servo transducer 62', so that they both have essentially the same inductance, resistance, and physical size. Neglecting factors such as unequal shielding, the amplitude of noise induced in both transducers 62' and 90' by a given electromagnetic field originating from data transducer 102, therefore, should be equal. However, the orientation of pole tips 110 of second servo transducer 90' helps to further prevent second servo transducer 90' from reading an unwanted signal from servo disc surface 16A.

A common impediment to the effectiveness of passive noise cancellation techniques for servo heads as described above is the effect of unequal shielding of the two servo transducers from electromagnetic noise radiated by data heads. Referring back to FIG. 6, although located on the same servo slider 60 as first (or active) servo transducer 62, second (or passive) servo transducer 90 may be placed such that it receives either more or less shielding, relative to the shielding received by first servo transducer 62, from noise generated by data head 26. Additionally, in disc stack data storage systems, if the discs do not effectively shield the servo transducers from noise generated by other data heads, the above described method of improving noise cancellation by placing the servo transducers equidistant from a nearby data transducer may become less effective.

Differences in shielding can be caused by a variety of things, including springs and bonded wires in the area of the servo head. Those differences are often non-repeatable differences and are, therefore, difficult to correct. The arrangement of servo transducers 62 and 90 as shown in FIG. 6 does not take into account the probable differences in shielding between first and second servo transducers 62 and 90 and data transducer 102. Likewise, servo transducers 62 and 90 may be unequally shielded from other data transducers as well. Because unequal shielding may cause noise sensed by first servo transducer 62 to not be equal to noise sensed by second servo transducer 90, incomplete cancellation of noise from the servo read output signal will affect the precision of the servo system during track following operations.

Figure 14:
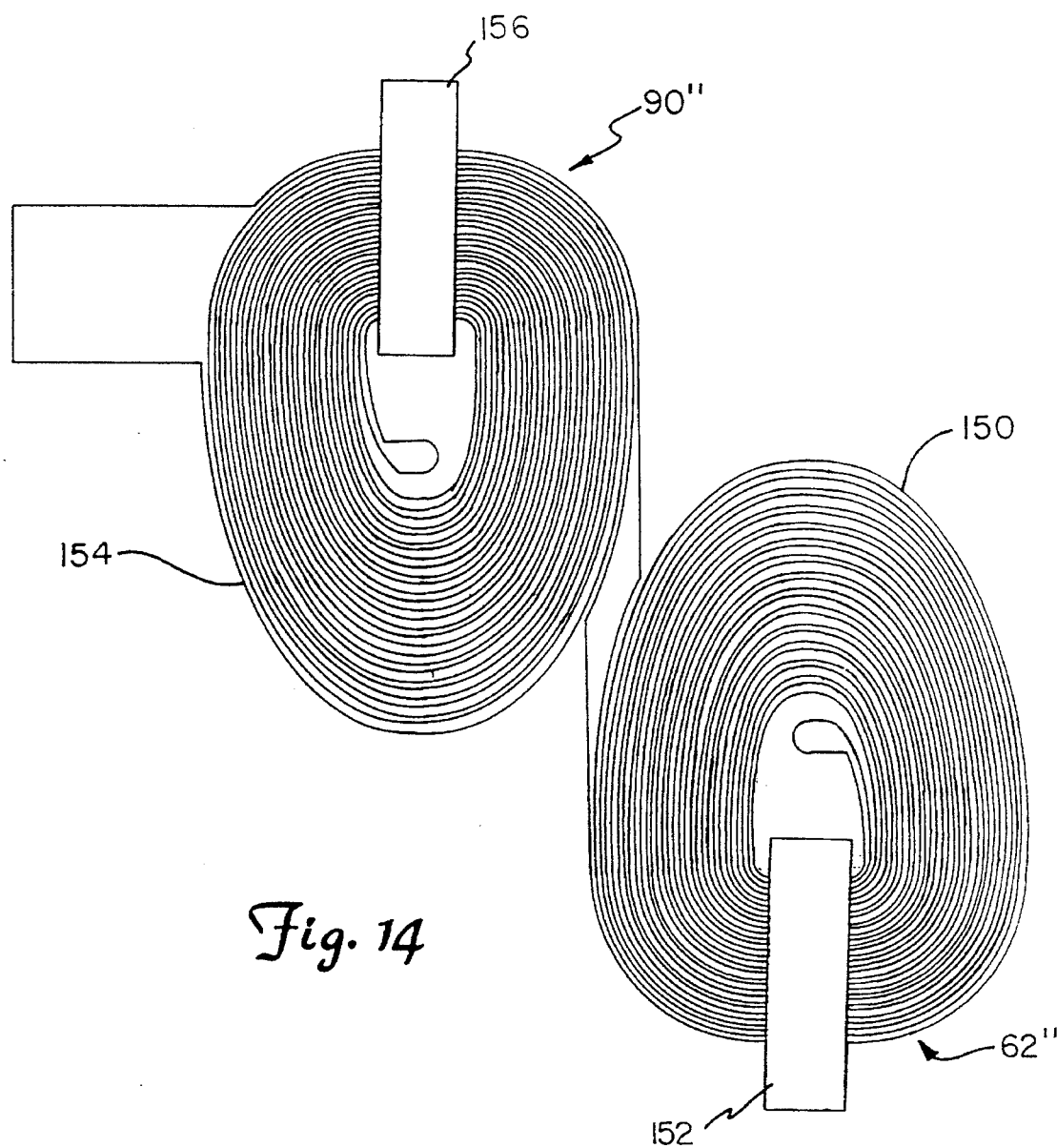
FIG. 14 shows first and second servo transducers connected and positioned adjacent one another, according to the present invention, to improve noise cancellation by reducing the possibility of unequal shielding.

FIG. 14 illustrates an embodiment of the invention set out in U.S. patent application Ser. No. 07/935,056 which reduces the effects of unequal shielding. FIG. 14 is a side view of first and second servo transducers 62" and 90". First servo transducer 62" includes conducting coil 150 and pole pieces 152, and is positioned so that its pole tips are facing servo disc surface 16A. Second servo transducer 90" includes conducting coil 154 and pole pieces 156. Servo transducer coils 150 and 154 are fabricated closely or immediately adjacent one another. The two servo transducers are once again connected in either a series-opposing connection or in a parallel-opposing connection. Although in FIG. 14 servo transducers 62" and 90" are shown side by side and to be positioned slightly offset from each other, the immediately adjacent spacing is not intended to be limited to this particular configuration. Transducers 62" and 90" can be positioned in any immediately adjacent configuration.

Figure 15:
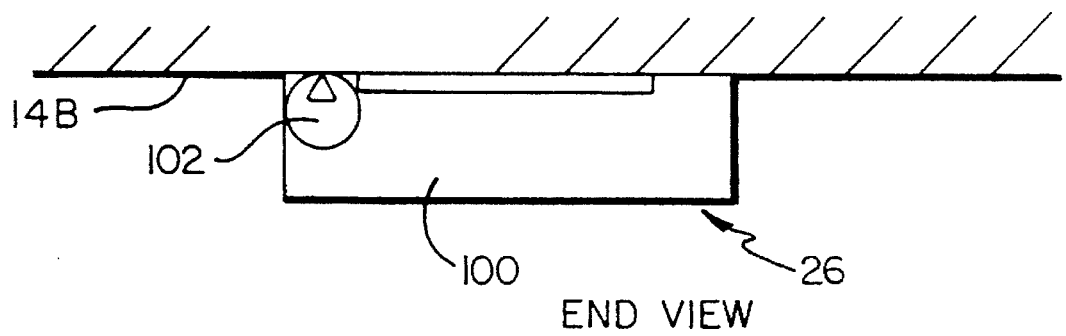
FIG. 15 is a diagram showing the close placement of the first and second servo transducers, in accordance with the present invention, to reduce the effects of unequal shielding on the noise cancellation technique.
Figure 15:
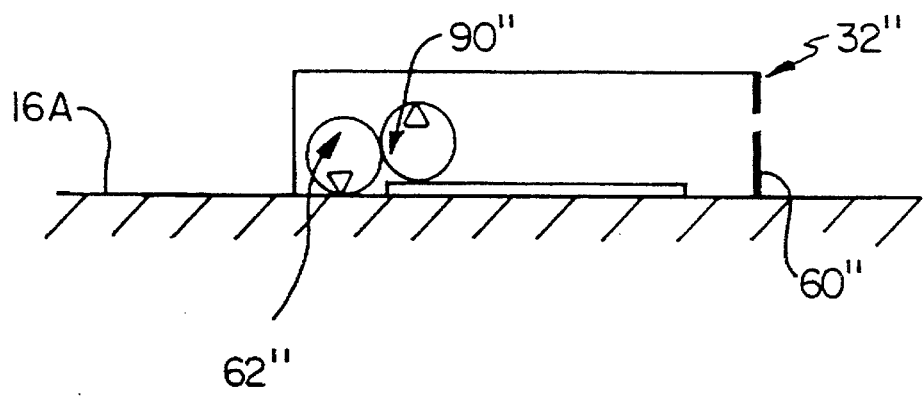

FIG. 15 further illustrates the embodiment shown in FIG. 14. FIG. 15 shows second servo transducer 90" placed immediately adjacent first servo transducer 62" on servo slider 60" from a side view perspective. The spacing between the first and second servo transducers is close relative to the size of the transducers. The close spacing between first servo transducer 62" and second servo transducer 90" allows noise originating from data head 26, and sensed by first servo transducer 62", to be approximately equal to data head noise sensed by second servo transducer 90". Because first servo transducer 62" and second servo transducer 90" are connected with opposing polarity, the output noise is more completely canceled since the amplitude of the noise induced in each separate servo transducer is approximately equal.

Figure 16:
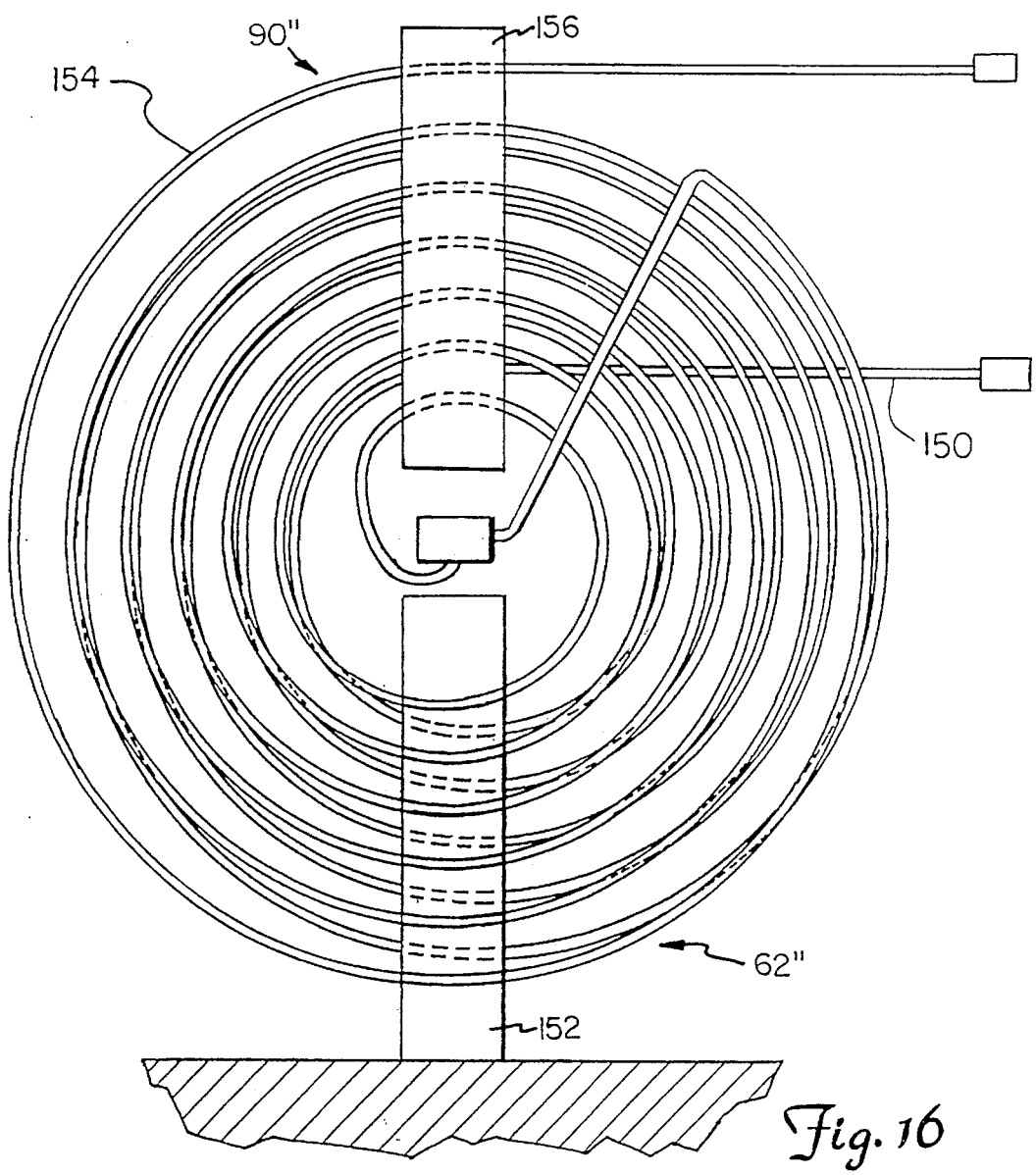
FIG. 16 is a diagram showing two servo transducers fabricated substantially one on top of the other.

FIG. 16 illustrates another embodiment of the invention disclosed in U.S. patent application Ser. No. 07/935,056. In FIG. 16, first and second servo transducers 62" and 90" are shown fabricated substantially one on top of the other. Once again, first servo transducer 62" includes coil 150 and pole pieces 152. Second servo transducer 90" includes coil 154 and pole pieces 156. In this embodiment, the fabrication process steps are approximately the same for each servo transducer, but are just repeated to achieve the fabrication of one servo transducer on top of the other.

Figure 17:
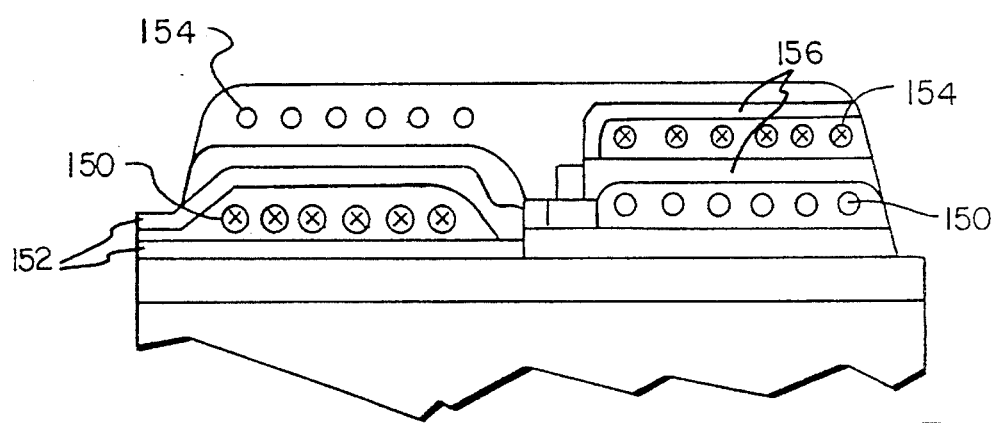
FIG. 17 is a sectional view of the servo transducers of FIG. 16 fabricated substantially one on top of the other.

FIG. 17 is a sectional side view of the embodiment shown in FIG. 16 with first and second transducers 62" and 90" fabricated substantially one on top of the other. Coils 150 of first servo transducer 62" are shown to be wound opposite coils 154 of second servo transducer 90". This provides the opposite polarity needed to cancel noise from the servo read output signal. Other embodiments include the first and second servo transducers being spaced substantially as close as possible to one another, being spaced close relative to the size of the servo slider, and having the close spacing limited by the size of the two servo transducers. In all of these embodiments, the first and second servo transducers are closely spaced to each other, but are not in physical contact in such a way as to short out the transducer's coils.

Figure 18:
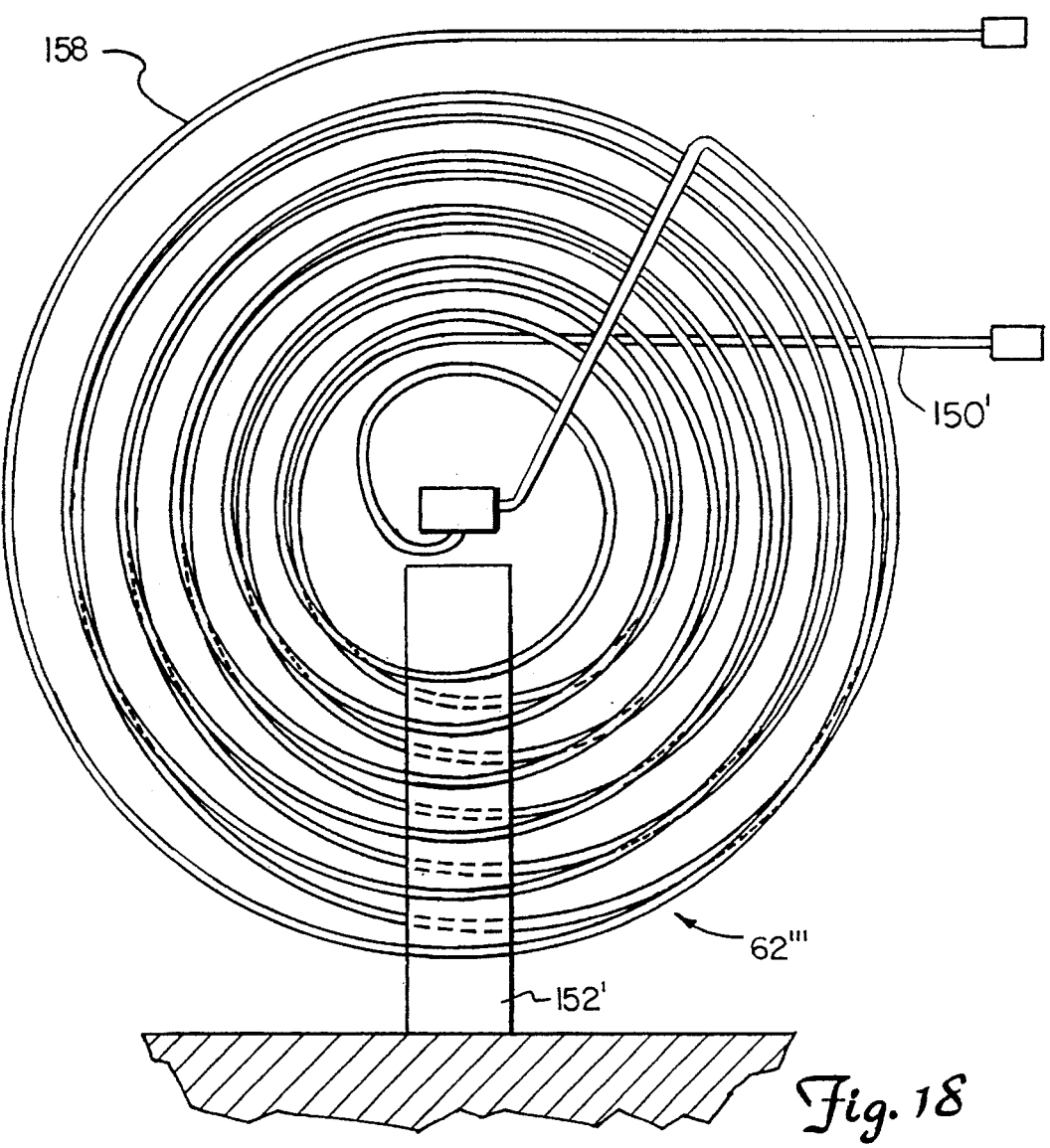
FIG. 18 is a diagram showing one preferred embodiment of the present invention in which a noise cancellation coil is fabricated substantially on top of a servo transducer.

FIG. 18 illustrates a preferred embodiment of the present invention which is used to further improve noise cancellation. In the embodiment shown in FIG. 18, instead of utilizing a first (or active) servo transducer and a second (or passive) servo transducer, the invention uses first servo transducer 62''' and noise cancellation or "bucking" coil 158. Servo transducer 62''' includes transducer coil 150' and pole pieces 152'. Transducer coil 150' and bucking coil 158 are connected in either a series-opposing configuration or in a parallel-opposing configuration. As before, transducer 62''' reads servo information from the servo disc. Coil 158 takes the place of a second servo transducer in canceling noise from the servo output signal.

Figure 19:
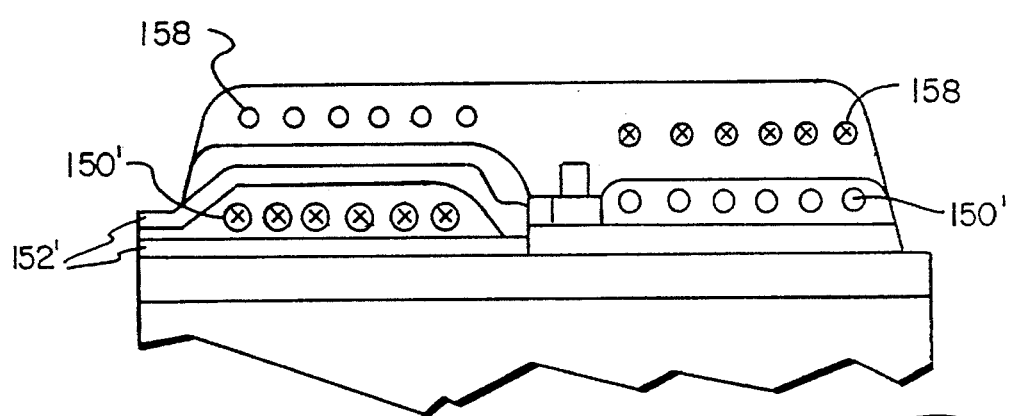
FIG. 19 is a sectional view of the noise cancellation coil of FIG. 18 fabricated substantially on top of the servo transducer.

FIG. 19 is a sectional side view of the embodiment of the present invention shown in FIG. 18, with coil 158 fabricated substantially on top of coil 150' and pole pieces 152' of first servo transducer 62'''. Coil 158 is shown to be wound with opposite polarity to coil 150'. This provides the opposite polarity needed to cancel noise from the servo read output signal. It should be noted that the number and thickness of layers of insulating material between bucking coil 158 and transducer 62''' may vary in different embodiments. However, in preferred embodiments, coil 158 is placed immediately adjacent to transducer 62''' in order to further improve the likelihood that coil 158 and transducer 62''' are subjected to equal noise.

The embodiment of the present invention shown in FIGS. 18 and 19 has several advantages over embodiments utilizing first and second servo transducers. First, a servo head which uses bucking coil 158, instead of employing a second servo transducer which includes pole pieces, requires fewer process steps to fabricate. Typically, the less process steps and the flatter the thin film layers, the easier and less expensive the fabrication process will be. In embodiments of the present invention in which bucking coil 158 is placed on the servo slider in the same plane as coils 150' and transducer 62''', the number of fabrication process steps may not be increased at all. In other embodiments in which bucking coil 158 is placed above or below the plane of coils 150', the number of process steps, may still be reduced.

Second, utilizing bucking coil 158 instead of a second servo transducer further reduces the effects of low level magnetic flux, from the servo disc, on coil 158. Even though a second servo transducer may be positioned on the slider, relative to the servo disc, to reduce the effects of the servo information on noise cancellation, the second servo transducer's pole pieces may still concentrate some low level magnetic flux from the servo disc into the transducer coils. However, because this embodiment of the present invention has no pole pieces, the effects of low level magnetic flux from the servo disc are further reduced.

In the embodiment shown in FIGS. 18 and 19, bucking coil 158 is fabricated substantially on top of servo transducer 62'''. Placing coil 158 immediately adjacent and/or as close as possible to transducer 62''' without short circuiting coils 150' and 158 allows noise originating from a nearby data head, and sensed by servo transducer 62''', to be approximately equal to data head noise sensed by coil 158. This is partially due to the increased likelihood that transducer 62''' and bucking coil 158 will receive equal shielding.

Because coil 158 and transducer 62''' are connected with opposing polarity, the output noise is more completely canceled since the amplitude of the noise induced in each of coil 158 and transducer 62''' is approximately equal. The closer coil 158 is to transducer 62''', the greater the chance that each will be exposed to the same magnetic fields. In preferred embodiments, however, coils 158 and 150' are separated slightly to reduce effects of electromagnetic noise resulting from coil 150' of transducer 62''' as transducer 62''' reads servo information from the servo disc.

Placing bucking coil 158 immediately adjacent to transducer 62''' also helps to reduce the potential effects of unequal shielding resulting when discs are constructed to be very thin and/or are constructed from materials such as glass which do not adequately shield the servo head from the multiple data heads in the disc stack data storage system. This factor is unique in many ways to disc stack data storage systems, and is a non-conventional configuration in these types of systems. As can be seen in FIG. 6, conventional design theory is to place one servo transducer on each of the rails or skis of the servo slider.

In other preferred embodiments, to further improve passive noise cancellation, bucking coil 158 and transducer coil 150' are substantially coaxial. Once again, this improves the chances that bucking coil 158 and transducer 62''' will be exposed to the same electromagnetic fields originating from a nearby data head. Also as shown in FIGS. 18 and 19, in preferred embodiments of the present invention, bucking coil 158 and transducer coil 150' have substantially the same number of turns and/or the same surface area. Each of these factors will further help to improve passive noise cancellation by increasing the likelihood that coil 158 and transducer 62''' will be exposed to the same extraneous electromagnetic fields.

Although in FIGS. 18 and 19, bucking coil 158 is shown fabricated on top of transducer 62''', in other embodiments, transducer 62''' may be fabricated on top of coil 158. In yet other embodiments, coil 158 is not fabricated on the servo slider in a position which is coaxial to coil 150' of transducer 62''', but rather, coil 158 may be fabricated on the servo slider immediately adjacent to transducer 62''' in a manner similar to the immediately adjacent placement of transducers 62'' and 90'' as shown in FIGS. 14 and 15. In these embodiments, the immediately adjacent placement can be such that coil 158 and transducer 62''' are placed on the servo slider as close as fabrication techniques and capabilities will allow without coil 158 being shorted with coil 150' and without coil 158 being exposed to electromagnetic radiation resulting from transducer 62''' reading servo information from the servo disc.

In still other embodiments, coil 158 is not placed adjacent to transducer 62''', but rather, may be positioned on the servo slider equidistant from transducer 62''' in the same manner as transducers 62' and 90' were placed in FIG. 13. However, in these embodiments, unequal shielding may prevent noise detected by servo transducer 62''' from being completely canceled by noise detected by coil 158. In any event, the equidistant placement of coil 158 and transducer 62''' from an adjacent data head will help improve passive noise cancellation. This is particularly true when the discs are constructed such that transducer 62''' and coil 158 are shielded from noise radiated from data heads other than the data head carried on the same actuator arm as the servo head.

The improved noise cancellation provided by the embodiments of the present invention are important because the servo head can be placed in the center of the disc stack and still have the data head across from it. This permits the utilization of all data disc surfaces, which maximizes the data capacity of the disc drive. In addition, the mechanical and thermal drift tolerance stack-up between the outer data heads and the servo head is minimized, which improves track following accuracy. This also allows the possibility of inclusion of more discs in the disc stack, which again increases overall data capacity.

Although the present invention has been described with reference to preferred embodiments, workers skilled in the art will recognize that changes may be made in form and detail without departing from the spirit and scope of the invention.

What is claimed is:

1. A data storage system, comprising:

a spindle;

a first magnetic disc mounted on the spindle for storing information;

a second magnetic disc mounted on the spindle for storing information;

a first head, positioned adjacent the first magnetic disc, the first head including a first slider and a first transducer mounted on the first slider for writing information to the first magnetic disc; and a second head, positioned adjacent the second magnetic disc, the second head including a second slider, a second transducer mounted on the second slider for reading information stored on the second magnetic disc, the second transducer having a transducer coil arranged to produce an output signal as a function of the information stored on the second magnetic disc, and a noise cancellation coil with no magnetic layer immediately adjacent the coil mounted on the second slider and connected to the transducer coil so that noise signals induced in the second transducer by operation of the first transducer tend to be canceled by noise signals induced in the noise cancellation coil by operation of the first transducer.

2. The data storage system of claim 1, wherein the second transducer and the noise cancellation coil are mounted on the second slider in positions which are substantially equidistant from the first transducer.

3. The data storage system of claim 1, wherein the second transducer and the noise cancellation coil are mounted on the second slider immediately adjacent one another.

4. The data storage system of claim 1, wherein the noise cancellation coil is so disposed and arranged on the second slider with respect to the second transducer as to be substantially coaxial with the transducer coil of the second transducer.

5. The data storage system of claim 4, wherein the noise cancellation coil has a number of turns which is approximately equal to a number of turns of the transducer coil of the second transducer.

6. The data storage system of claim 4, wherein the noise cancellation coil has a surface area which is approximately equal to a surface area of the transducer coil of the second transducer.

7. The data storage system of claim 4, wherein the noise cancellation coil is immediately adjacent to the second transducer.

8. The data storage system of claim 1, wherein the first magnetic disc comprises:

a data disc for storing data.

9. The dam storage system of claim 8, wherein the second magnetic disc comprises:

a servo disc for storing servo information.

10. The data storage system of claim 9, wherein the second transducer is a servo transducer for reading the servo information stored on the second disc.

11. The data storage system of claim 10, wherein the second transducer and the noise cancellation coil are connected to produce the output signal as a function of the servo information stored on the servo disc.

12. The data storage system of claim 10, and further comprising:

a servo actuator for positioning the first head and the second head as a function of the output signal.

13. The data storage system of claim 1, wherein an insulating layer insulates the noise cancellation coil from the second transducer.

14. The data storage system of claim 1, wherein the first head is further positioned between the first and second magnetic discs.

15. The data storage system of claim 14, wherein the second head is further positioned between the first and second magnetic discs.

16. A servo head for use in a disc stack data storage system, the disc stack data storage system having a magnetic data disc surface on which information is stored in data tracks, a magnetic servo disc surface on which servo information is stored in servo data tracks, and a data head positioned adjacent the magnetic data disc surface for writing information to the magnetic data disc surface, the servo head being positioned adjacent the magnetic servo disc surface, the servo head including:

a servo slider;

a servo transducer mounted on the servo slider for reading information stored on the magnetic servo disc surface, the servo transducer having a servo transducer coil arranged to produce an output signal as a function of the information stored on the magnetic servo disc surface;

a noise cancellation coil with no magnetic layer immediately adjacent the coil mounted on the servo slider and connected to the servo transducer coil so that noise signals induced in the servo transducer by operation of the data head tend to be canceled by noise signals induced in the noise cancellation coil by operation of the data head.

17. The servo head of claim 16, wherein the servo transducer and the noise cancellation coil are mounted on the servo slider in positions which are substantially equidistant from a data transducer positioned on the data head.

18. The servo head of claim 16, wherein the servo transducer and the noise cancellation coil are mounted on the servo slider immediately adjacent one another.

19. The servo head of claim 16, wherein the noise cancellation coil is positioned on the servo slider so as to be substantially coaxial with the servo transducer coil.

20. The servo head of claim 16, wherein the noise cancellation coil has a number of turns which is approximately equal to a number of turns of the servo transducer coil.

21. The servo head of claim 16, wherein the noise cancellation coil has a surface area which is approximately equal to a surface area of the servo transducer coil.

22. The servo head of claim 16, wherein the magnetic data disc surface is located on a first magnetic disc and the magnetic servo disc surface is located on a second magnetic disc such that the magnetic data disc surface and the magnetic servo disc surface oppose one another.

* * * * *

UNITED STATES PATENT AND TRADEMARK OFFICE
CERTIFICATE OF CORRECTION

PATENT NO. : 5,461,528
DATED : October 24, 1995
INVENTOR(S) : BEAT G. KEEL, GALE JALLEN, PAUL A. JALLEN, LANCE E. STOVER, HALDEN W. LARSON It is certified that error appears in the above-indentified patent and that said Letters Patent is hereby corrected as shown below:

Col. 4, line 38, delete "a-flat", insert --a flat--

Col. 12, line 28, delete "dam", insert --data--

Signed and Sealed this

Ninth Day of January, 1996

Attest:

BRUCE LEHMAN

*Attesting Officer*     *Commissioner of Patents and Trademarks*